(12) United States Patent
Mickle et al.

(10) Patent No.: US 7,469,390 B2
(45) Date of Patent: *Dec. 23, 2008

(54) METHOD AND SOFTWARE TOOL FOR AUTOMATIC GENERATION OF SOFTWARE FOR INTEGRATED CIRCUIT PROCESSORS

(75) Inventors: Marlin H. Mickle, Pittsburgh, PA (US); James T. Cain, Pittsburgh, PA (US); Swapna Dontharaju, Pittsburgh, PA (US); Raymond R. Hoare, Pittsburgh, PA (US); Alex Jones, Pittsburgh, PA (US)

(73) Assignee: University of Pittsburgh - Of the Commonwealth System of Higher Education, Pittsburgh, PA (US)

( * ) Notice: Subject to any disclaimer, the term of this patent is extended or adjusted under 35 U.S.C. 154(b) by 252 days.

This patent is subject to a terminal disclaimer.

(21) Appl. No.: 11/406,194

(22) Filed: Apr. 18, 2006

(65) Prior Publication Data

US 2006/0271912 A1  Nov. 30, 2006

Related U.S. Application Data

(60) Provisional application No. 60/672,347, filed on Apr. 18, 2005.

(51) Int. Cl.
*G06F 17/50* (2006.01)
(52) U.S. Cl. .............................. 716/3; 716/17; 716/18
(58) Field of Classification Search ..................... 716/3, 716/17, 18
See application file for complete search history.

(56) References Cited

U.S. PATENT DOCUMENTS

| 5,841,663 | A | * | 11/1998 | Sharma et al. ................. 716/18 |
| 6,408,428 | B1 | * | 6/2002 | Schlansker et al. ............ 716/17 |
| 6,470,482 | B1 | * | 10/2002 | Rostoker et al. ............... 716/6 |
| 6,591,403 | B1 | * | 7/2003 | Bass et al. ...................... 716/5 |
| 6,874,134 | B1 | * | 3/2005 | Collin et al. .................... 716/3 |
| 2002/0120914 | A1 | * | 8/2002 | Gupta et al. ................... 716/17 |
| 2002/0133784 | A1 | * | 9/2002 | Gupta et al. ................... 716/1 |
| 2008/0028355 | A1 | * | 1/2008 | Mickle et al. ................. 716/17 |

* cited by examiner

*Primary Examiner*—Phallaka Kik
(74) *Attorney, Agent, or Firm*—Philip E. Levy; Eckert Seamans Cherin & Mellott LLC

(57) ABSTRACT

A method of generating software code for a processor of an IC based on a simple input description of the IC's standards. The method includes generating a macros description of each of the primitives from the standards and the response corresponding to each of the primitives, wherein the macros description includes information relating to a number of first fields for each of the primitives and a number of second fields for each response. The method further includes generating a blank version of a template that includes each of the second fields and receiving a completed version of the template, wherein the completed template specifies a behavior of the integrated circuit in response to the primitives. Finally, the method includes compiling the software code based on the macros description and the completed version of the template. Also, a software tool implementing the method is provided.

14 Claims, 8 Drawing Sheets

"OWNERID WRITE" COMMAND FORMAT

| Prefix | Type | OwnerID | Tag ID | Interragator ID | Command Code | CRC |
|---|---|---|---|---|---|---|
| 8 Bits | 8 Bits | 24 Bits | 32 Bits | 16 Bits | 8 Bits | 16 Bits |

RESPONSE FORMAT

| Tag Status | Message Length | Interragator ID | Tag ID | Command Code | CRC |
|---|---|---|---|---|---|
| 16 Bits | 8 Bits | 16 Bits | 32 Bits | 8 Bits | 16 Bits |

TAG STATUS FORMAT

| Mode Field | Reserved | Acknowledge | Tag Type | Reserved | User ID | Battery |
|---|---|---|---|---|---|---|
| 4 Bits | 3 Bits | 4 Bits | 2 Bits | 3 Bits | 1 Bit | 1 Bit | 1 Bit |

FIG. 5 declarations
prefx (8)
type (8)
ownerid (24)
interid (16)
tagid (32)
comcode (8)
siz (16)
res (8)
crc (16)
tagstatus (16) [
    modefield (4)
    reserved1 (3)
    acknowledge (4)
    reserved2 (2)
    tagtype (3)
    reserved3 (1)
    userid (1)
    battery (1)
]
mesglen (8)

main
ionw (137)  prefx      type     ownerid   tagid     interid   comcode   crc
            tagstatus  mesglen  interid   tagid     comcode   crc
icol (16)   prefx      type     ownerid   interid   comcode   siz       res
            tagstatus  mesglen  interid   tagid     ownerid   crc       crc

FIG. 6

```
// Behavioral C of ICOL follows
TAGSTATUS .modefield =
TAGSTATUS .reserved1 =
TAGSTATUS .acknowledge =
TAGSTATUS .reserved2 =
TAGSTATUS .tagtype =
TAGSTATUS .reserved3 =
TAGSTATUS .userid =
TAGSTATUS .battery =

RESPONSE .mesglen =
RESPONSE .interid =
RESPONSE .tagid =
RESPONSE .ownerid =
RESPONSE .crc =
```

FIG. 7(a)

```
TAGSTATUS .modefield = 0;
TAGSTATUS .reserved1 = 7;

if (commandValid)
    TAGSTATUS .acknowledge = 0;
else
    TAGSTATUS .acknowledge = 1;

TAGSTATUS .reserved2 = 3;
TAGSTATUS .tagtype = 2;
TAGSTATUS .reserved3 = 1;
TAGSTATUS .userid = 1;
TAGSTATUS .battery = 0;
RESPONSE .mesglen = 112;
RESPONSE .interid = interid;
RESPONSE .tagid = tagid;
RESPONSE .ownerid = ownerid;
RESPONSE .crc = crc;
```

FIG. 7(b)

```
declarations
prefix (8)
type (8)
ownerid (24)
interid (16)
tagid (32)
comcode (8)
siz (16)
res (8)
crc (16)
tagstatus (16) [
        modefield(4)
        reserved1 (3)
        acknowledge (4)
        reserved2 (2)
        tagtype (3)
        reserved3 (1)
        userid (1)
        battery (1)

]
mesglen (8)
error (8)
position (16)
makedate (8)
prodcode (32)
```

| main | | | | | | | | |
|---|---|---|---|---|---|---|---|---|
| ionw (137) | prefix | type | ownerid | tagid | interid | comcode | crc | |
|  | tagstatus | mesglen | interid | tagid | comcode | crc | | |
| icol (16) | prefix | type | ownerid | interid | comcode | siz | res | crc |
|  | tagstatus | mesglen | interid | tagid | ownerid | crc | | |
| ager (26) | comcode | interid | tagid | crc | | | | |
|  | tagid | interid | error | crc | | | | |
| abpn (28) | comcode | interid | tagid | crc | | | | |
|  | tagid | interid | crc | | | | | |
| spos (01) | comcode | interid | tagid | position crc | | | | |
|  | tagid | interid | crc | | | | | |
| gpos (2) | comcode | interid | tagid | crc | | | | |
|  | tagid | interid | position | crc | | | | |
| gdat (03) | comcode | interid | tagid | crc | | | | |
|  | tagid | interid | makedate | crc | | | | |
| gcod (04) | comcode | interid | tagid | crc | | | | |
|  | tagid | interid | prodcode | crc | | | | |

FIG. 8

METHOD AND SOFTWARE TOOL FOR AUTOMATIC GENERATION OF SOFTWARE FOR INTEGRATED CIRCUIT PROCESSORS

CROSS-REFERENCE TO RELATED APPLICATION

This application claims the benefit of U.S. Provisional Application No. 60/672,347, entitled "Method For Automatic Generation Of Software For Integrated Circuit Microprocessors," which was filed on Apr. 18, 2005, the disclosure of which is incorporated herein by reference.

FIELD OF THE INVENTION

The present invention relates to programming for integrated circuit processors, and in particular to a method and associated software tool for automatically generating software for a processor of an integrated circuit such as an integrated circuit forming part of an RFID tag.

BACKGROUND OF THE INVENTION

Many current devices and systems employ integrated circuits (ICs) that are customized and tailored to a particular application. Such ICs include microprocessors that execute software that has been custom designed for the particular application in question. For example, the use of radio frequency identification (RFID) systems is expanding rapidly in a wide range of application areas. RFID systems consist of radio frequency tags or transponders and radio frequency readers or interrogators. The RFID tags include ICs and an antenna for communication over an air interface. The RFID readers query the RFID tags for information stored on them, which can be, for example, identification numbers, user written data, or sensed data. RFID systems have thus been applied in many application areas to track, monitor, report and manage items as they move between physical locations. Most RFID systems are implemented using customized requirements that are defined ad hoc. In addition, multiple, often competing, standards exist for RFID hardware, software and data management. As a result, in most applications, RFID tag and reader hardware and software must be specifically designed for each particular application, and must be modified or re-designed every time the specification for the current application is adjusted, new applications are introduced, and/or the standards are modified or new standards are developed. Thus, as RFID systems exemplify, the underlying feature in many IC applications is the use of proprietary hardware and software that is non-reusable and tailored to the particular application in question.

The design, development, and fabrication of customized ICs constitute a very costly and time consuming process. As an example, the license for a single seat for software to do commercial IC design can cost as much as $350,000 per year. In addition, the salary of a person qualified to design an IC device can be significant. As a result, many small companies are, from a cost standpoint, prohibited from designing their own ICs, and must instead pay for another party to do the customization. There are also numerous generic ICs, such as those on RFID tags and ICs used in other communications applications or related areas, that can be purchased from OEM suppliers. These generic ICs can be customized for a particular application using the software that is executed by the IC microprocessor. However, with prior art technology, this customization process is difficult and costly, and therefore is not always a viable solution for many companies, particularly smaller ones, to do on their own. There is thus a need for a method and software tool that facilitates, in a cost effective manner, the design of a customized IC, such as those on an RFID tag, that begins with a generic IC available from or customized by an IC supplier.

SUMMARY OF THE INVENTION

The present invention provides a method of generating software code for execution by a processor of an IC, such as those on an RFID tag, that includes a compilation flow that automatically generates software for the IC based on a simple input description of the IC's standards or requirements. The invention can be used to generate executable code for any microprocessor using any standard or custom protocol. At any later stage, the commands in the input description can be added or removed to describe a new standard that is a subset, a superset or a completely disjoint set of the original standard. The invention automatically generates the software corresponding to the new description in a significantly short time.

An overview of the methodology and compilation flow of the present invention is provided schematically in FIG. 1. For ease of description herein, the invention is described in terms of an RFID implementation. However, as will be appreciated, the methodology and compilation flow of the present invention may be used to generate executable code for other types of generic ICs. The invention utilizes an RFID compiler 5 that takes as input simple assembly-like descriptions of the standards for the RFID, represented at 10, which are known as RFID macros. The standards for the RFID specify the set of RFID primitives, or commands to the RFID tag, and the tag's behavior in response to the primitives. The user defines the RFID tag's response behavior in a programming language such as ANSI C, which is also input into the compiler. Templates are automatically generated to guide the user in writing the response behavior. The compiler generates code 15 for the RFID tag controller, such as C code, based on the inputs. The generated code can be executed on an embedded compiler 20 of the RFID tag 25. The invention is extensible as it allows for addition (or removal) of a set of custom primitives that may be a subset or superset of the original standard. Because of its extensible nature, the invention can accommodate for multiple, often competing, standards such as existing efforts from ISO and ANSI while also serving the needs of current and future applications.

BRIEF DESCRIPTIONS OF THE DRAWINGS

The accompanying drawings illustrate presently preferred embodiments of the invention, and together with the general description given above and the detailed description given below, serve to explain the principles of the invention as shown throughout the drawings, like reference numerals designate like corresponding parts.

FIG. 1 is a schematic diagram illustrating the compilation flow of an embodiment of a method of automatically generating software for an integrated circuit processor according to the present invention;

FIGS. 2(a) and 2(b) are schematic diagrams of alternative embodiments of a typical RFID system;

FIG. 5 is a schematic representation showing the format of the fields of a particular RFID primitive and response;

FIG. 6 shows an RFID macros specification of the RFID primitive and response shown in FIG. 5;

Figure 1:
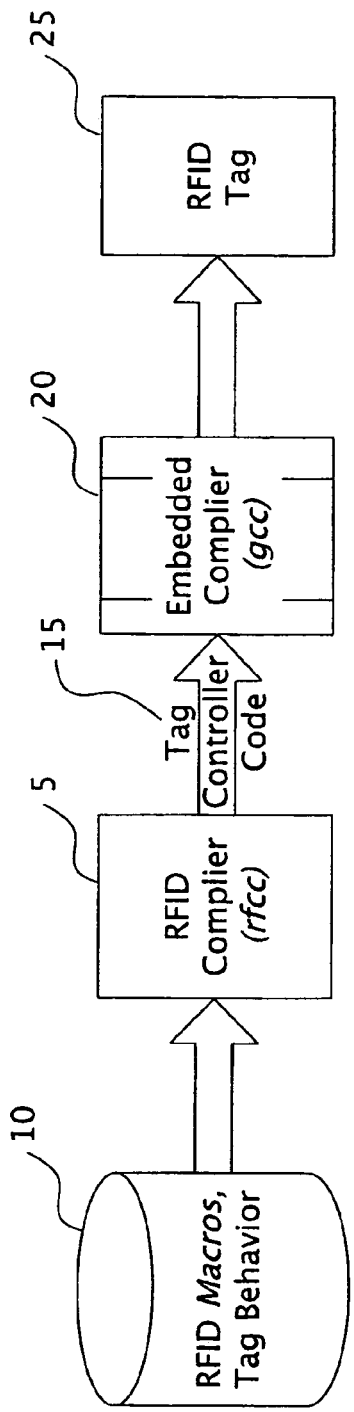

FIGS. 7(*a*) and 7(*b*), respectively, are uncompleted and completed templates for specifying response behavior for a RFID primitive; and FIG. 8 shows an extended macros specification according to a further aspect of the present invention.

DESCRIPTION OF THE PREFERRED EMBODIMENTS

Numerous communications standards for ICs, such as those on RFID tags, are specified in terms of what are commonly known as primitives. Primitives are the commands that are to be sent to the IC as specified in the standard. Once a primitive is received, the IC is to respond in some manner. This response may be: (1) a change in state of the IC (and/or the device including the IC such as an RFID tag), (2) a message transmitted from the IC to another device such as a base station or other receiver, or (3) both (1) and (2). Each primitive typically includes a number of data fields of varying length that include a field for specifying the command type and one or more fields for containing data.

Each primitive is similar in concept to an assembly language instruction that, once assembled in machine code format (an array of bits) and executed, causes some resultant behavior of the processor. Thus, the primitive is converted into a binary coded string (like a machine language instruction) that is transmitted to an IC, such as over an air interface to an RFID tag. The IC precipitates a behavior (decode and state change) resulting in a state change (memory or register change) and possibly a data response transmission through a communications channel to a receiving device, such as through an air interface to an RFID reader.

As described above, the custom fabrication of an Application Specific IC (ASIC) to be employed in, for example, an RFID tag, is cost prohibitive for many companies. To be commercially viable, the company would have to produce an ASIC that satisfies existing and applicable standards specified in the form of the primitives of the standards. As also noted above, there are many sources for generic ICs such as general purpose processors. General purpose processors have their own machine language and a compiler that will compile a program in, for example, the C, C++ or a similar programming language, that can be run on the processor. The present invention provides a path from a set of input macros, based on the applicable primitives, that automatically generates code, such as C code, providing the core control of the system. The user writes software segments in C, C++ or another suitable programming language that describes the desired system behavior of each macro. The tool combines the automated and user defined codes into a single program that can be compiled and executed by the processor of a commercially available generic IC.

For ease of description herein, the invention will be described in terms of an RFID implementation. However, as will be appreciated, the methodology and compilation flow of the present invention may be used to generate executable code for other types of generic ICs, such as those used in various communications applications.

Figure 2A:
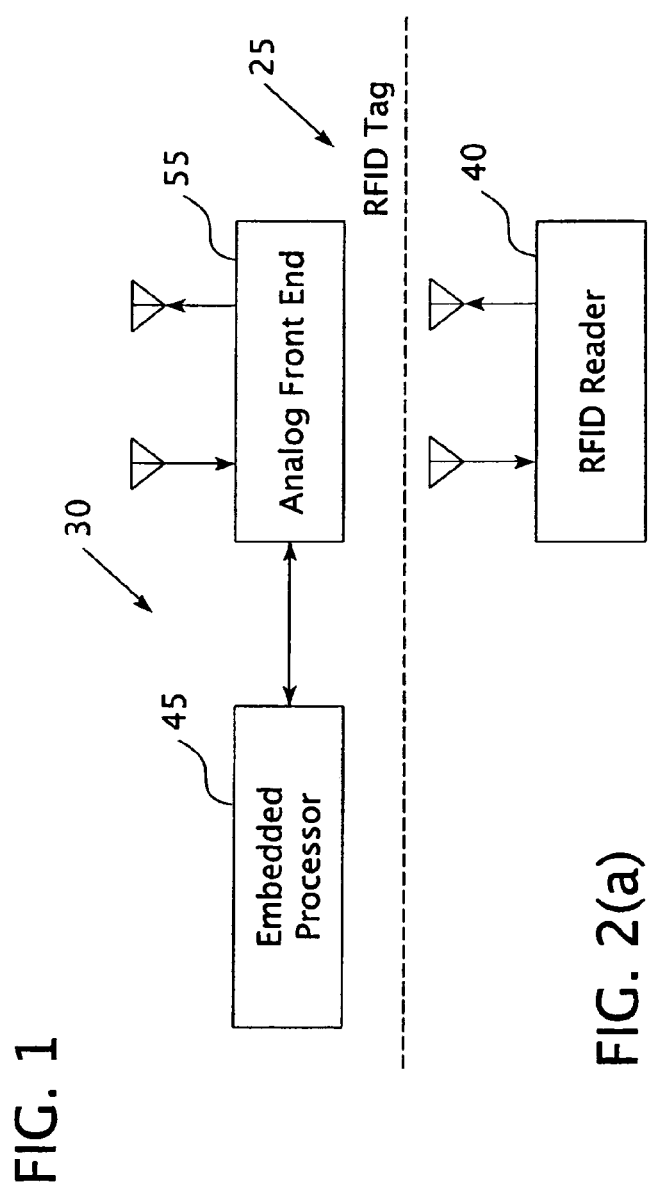
Figure 2B:
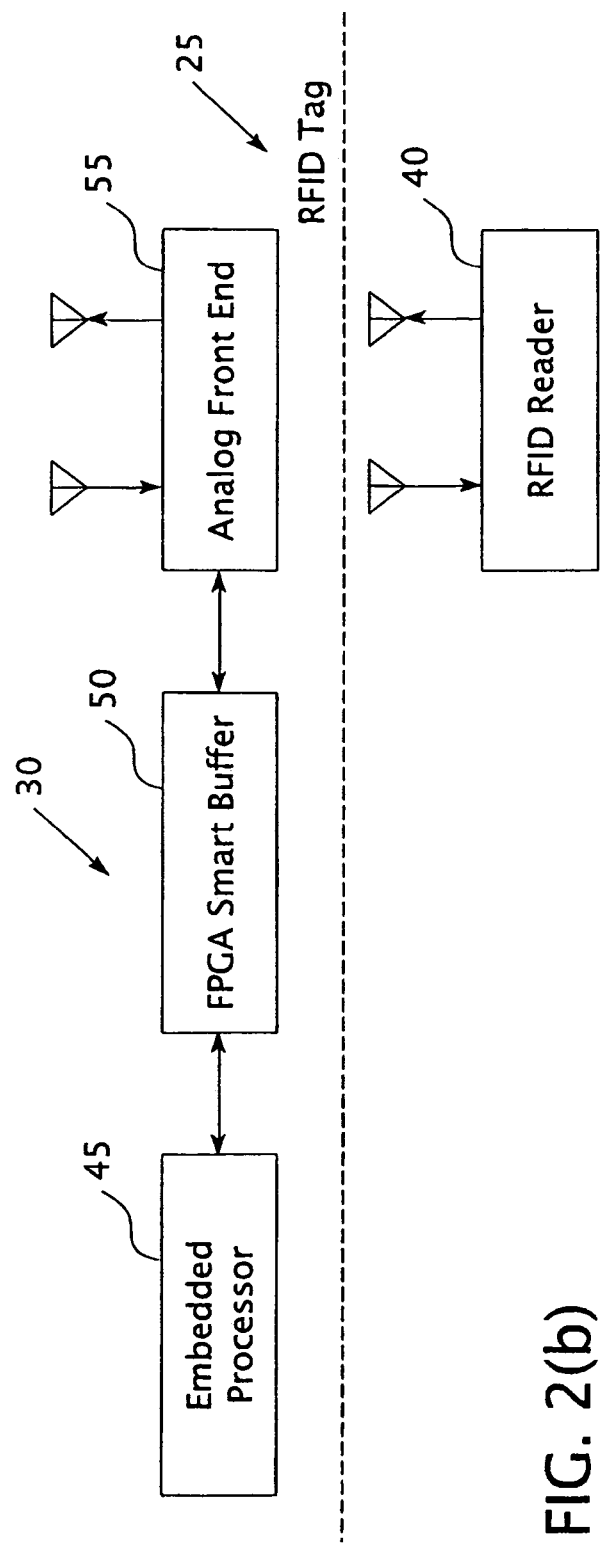

As shown in FIGS. 2(*a*) and 2(*b*), a typical RFID system 30 consists of an RFID tag 25, as described in connection with FIG. 1, and an RFID reader 40. In the case of the embodiment of FIG. 2(*a*), The RFID tag 25 includes an embedded processor 45 and an analog front end 55 having receiver and transmitter circuitry. Alternatively, in the case of the embodiment of FIG. 2B, the RFID tag 25 includes an embedded processor 45, a smart input/output buffer/co-processor implemented in custom hardware for the embedded processor, such as an FPGA smart buffer coprocessor 50, and an analog front end 55 having receiver and transmitter circuitry. The RFID compiler 5 of the present invention, described in greater detail below. generates a C program that can be executed on the embedded processor 45 that has its own C compiler. The purpose of the FPGA smart buffer coprocessor 50 of the embodiment of FIG. 2(*b*) is to enable the embedded processor 45 to be in a low-power sleep mode most of the time. The FPGA smart buffer coprocessor 50 offloads the data communications from the embedded processor 45, allowing the embedded processor 45 to be in a low power state when data is being received and sent. The embedded processor 45 is brought back to its normal operating mode only after the full data packet is received. The analog front end 55 serves as an interface between the FPGA smart buffer coprocessor 50 and the RFID reader 40, with the necessary receiver and transmitter circuitry to allow the RFID tag 25 to communicate with the RFID reader 40.

As discussed elsewhere herein, the typical format for RFID communications between the RFID reader 40 and the RFID tag 25 is a set of commands from the RFID reader 40, known as primitives, and a corresponding response or action of the RFID tag 25. The primitives vary among the numerous known standards and often need to be augmented, by creating additional custom primitives, based on the needs of particular custom applications. The methodology and compilation flow of the present invention automatically generates code for the RFID tag controller (embedded processor 45) based on a description of the primitives and corresponding responses to be implemented.

Figure 3:
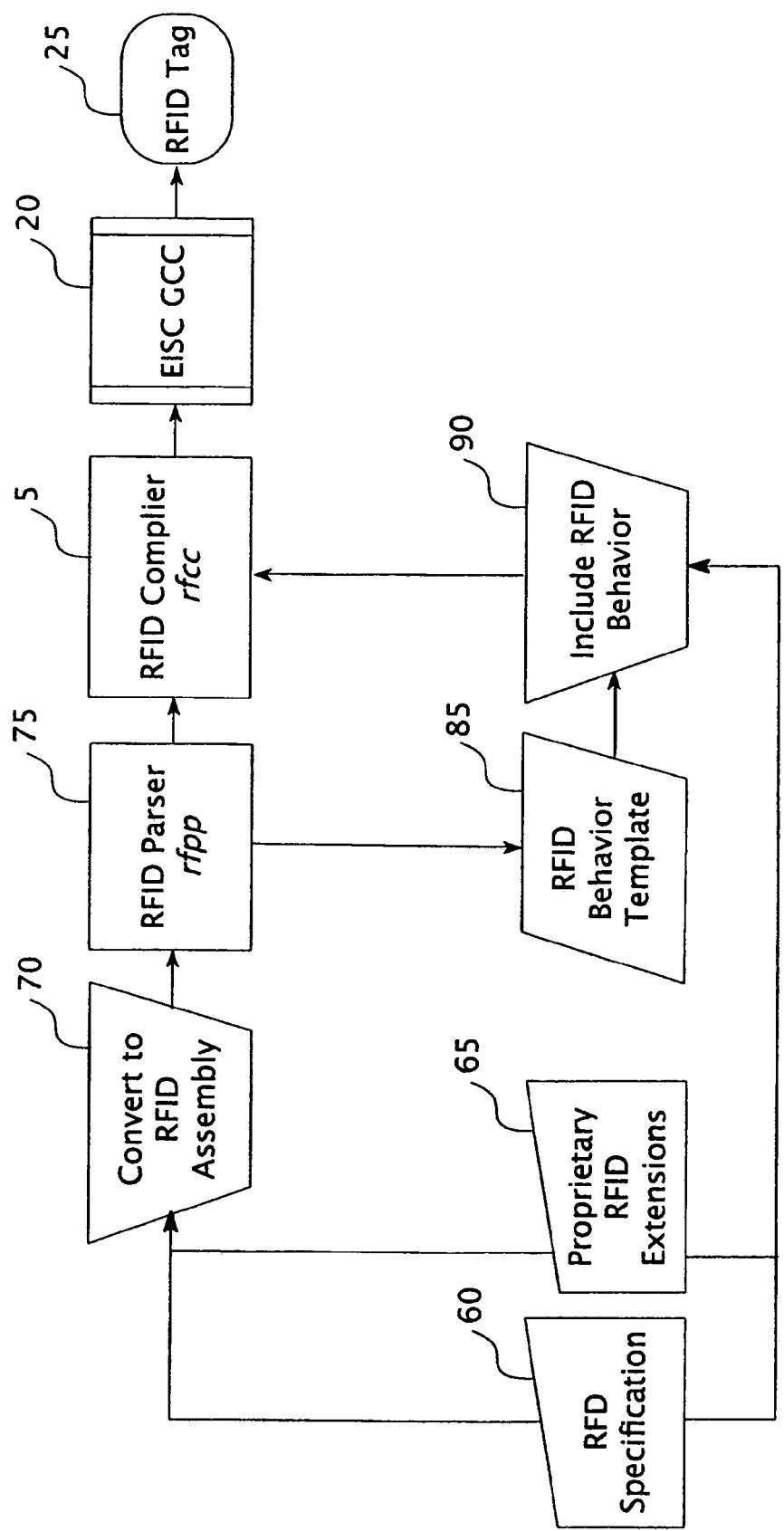
FIG. 3 is a schematic flow diagram illustrating an embodiment of the method of the present invention.

FIG. 3 is a schematic flow diagram of the methodology and compilation flow of the present invention, as implemented in an RFID application. Again, as noted above, implementation in an RFID application is only one embodiment of the present invention, and it will be appreciated that the invention can be used in connection with other suitable IC applications. The RFID primitives from the applicable standards specification, represented at 60, the proprietary extensions (custom primitives), if any, represented at 65, and the corresponding response to each are, as represented at 70, first converted into simple assembly-like descriptions referred to as RFID macros, which were described in FIG. 1 at reference numeral 10. The RFID macros 10 could also be described using existing languages like XML or even using a graphical interface. Next, an RFID parser, represented at 75, reads the RFID macros and builds them into the RFID compiler, represented at 80. The user then defines the behavior of the RFID tag 25 in response to each RFID primitive, represented at 60, in ANSI C (i.e., the user specifies the responses). To simplify the user interaction, the RFID parser, represented at 75, automatically generates templates, represented at 85, indicating where the user must specify behavior. The user writes simple ANSI C constructs, represented at 90, to describe the required RFID tag 25. The RFID compiler 5, described in connection with FIG. 1, then generates the C code for the RFID tag processor 45 based on the input RFID macros 10 and the specified tag behavior. The C code, once generated, is compiled using the RFID tag's embedded compiler 20, described in connection with FIG. 1, to generate executable code for the embedded processor 45 of the RFID tag 25.

Figure 4:
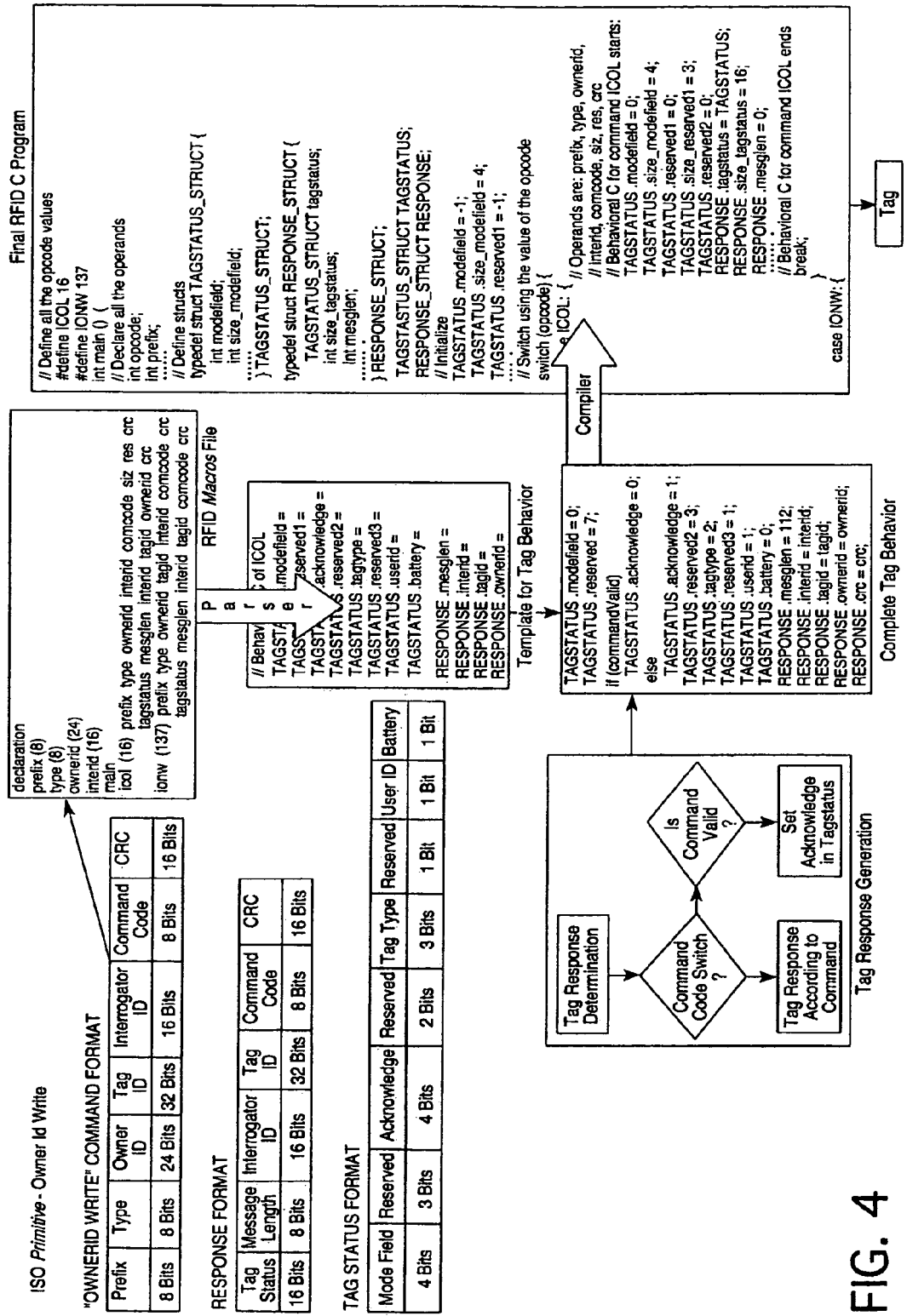
FIG. 4 is a schematic diagram illustrating the compilation flow for a specific set of RFID primitives.

FIG. 4 schematically illustrates the complete compilation flow for a specific set of example RFID primitives from the ISO standard. The following sections describe the example methodology and compilation flow in more detail.

1. Macros Specification

As described above, the simple assembly-like descriptions corresponding to the RFID primitives and their responses are termed RFID macros (represented by reference numeral 10 in FIG. 1). As an illustration of the RFID macro representation, a primitive known as "Owner Id Write" has been selected from the ISO/IEC 18000-7:2004(E) standard. The format of the fields in the primitive and its response is illustrated in FIG. 5. As seen in FIG. 5, each RFID primitive has a unique field that serves as a type of command, called the command code or opcode. In addition to the command code, each RFID primitive contains a number of other fields of varying length as positions for data that is present. Similarly, the response to each RFID primitive has a number of fields of varying length as positions for data that is present.

FIG. 6 shows the RFID macros file corresponding to the Owner id write primitive shown in FIG. 5. Each RFID macro description has a short character string that corresponds to the name of the primitive, a number corresponding to the value of the command code or opcode, a set of operands corresponding to the primitive's format and a set of operands corresponding to the response format. In order to capture the details of the lengths of each field in the primitive, the macros file has been conceptually broken into a declarations section and a main section. The declarations section allows the user to pre-declare the lengths of all the fields that will occur in the primitives and the responses. This eliminates the need to specify each field's length multiple times, since a field can occur in multiple primitives and/or multiple responses. In the main section, the primitives and corresponding responses are defined in terms of the fields thereof. In some cases, the fields in the primitive or the response have nested fields of varying lengths. These fields can be described with ease as shown in FIG. 6, thereby providing the user with the capability to adopt any level of granularity in manipulating the primitives and/or responses. In the macro shown in FIG. 6, the string used to denote the Owner Id Write primitive is "ionw." The decimal value of the command code corresponding to the Owner id write primitive command is "137."

The RFID macros (represented by reference numeral 10 in FIG. 1) may be generated in the following manner. The initial step is to introduce an intermediate macro concept or representation, specifically termed an RFID macro representation, where the resulting macros convert the primitive from the specified standard form. The mechanism by which this is done is to provide for the user to specify the lengths of the fields actually present in the RFID primitive and in the corresponding response by the RFID tag. To implement the RFID macro, input fields consisting of short character strings represent the name of the primitive, the specific numerical value of opcode of the primitive prescribed as described in the standard, and any of the other fields corresponding to the primitive, and the corresponding fields that are to be specified in the response.

2. Template for Behavior

As discussed above, in an RFID system, such as RFID system 30, the RFID reader, such as RFID reader 40, transmits an RFID primitive to the RFID tag, such as RFID tag 25, through an air interface. The RFID tag has to respond to the primitive by way of changing its current state and/or transmitting a message back to the RFID reader. The nature of the RFID tag's behavior thus has to be specified so that it can be incorporated in the end software. The user has to specify RFID tag behavior in a programming language such as ANSI C.

To make the user interaction simple, the RFID compiler 5 of the present invention generates a template for the response behavior based on the information in the macros file. Any programming (e.g., C) constructs (e.g., conditionals, loops, etc.) which are necessary to completely specify the behavior of each response can be added by the user. The template generated for the collection command primitive, referred to as "icol" in the macros specification shown in FIG. 5, is shown in 7(*a*). A file containing similar templates for all the macros that were included in the macros specification file will be generated for the user.

Templates may be generated in the following manner. First, the RFID macros that are generated are input into the compiler 5, which includes scanning and parsing stages. The scanner recognizes the individual field specifications (termed tokens) in the macros file created as described above. As in the classical case, the tokens then become the input to the parser. The next step is for the parser to convert the syntactic structure of the input macros file by making use of the built in grammar of the macros. This step is repeated until all token have been processed. The next step in the process is to create what is termed an abstract syntax tree, that is in fact an internal representation of the input macros. This resulting data structure encodes the information of all the macros, namely their names, opcodes, and the names and lengths of their fields.

The next step is to represent each response and each nested field in the response in the form of C language constructs termed structs. The details of the names and sizes of the fields in the response are present in the structs. Each struct is then converted into a form to create the templates that are presented to the user to allow the user to interact and input specific values.

Next, the user specifies what logical state the RFID tag, such as RFID tag 25, should be in when the particular RFID primitive (transmitted to the RFID tag) is received and the values of the fields of the response to be generated. Additionally, the user may use C language constructs such as conditionals, loops, etc. to check the values of the fields of the incoming RFID primitive, and to specify the values of the fields of the response.

All of the details regarding the size and the position of the fields in the primitive and in the response packet are built into the RFID compiler 5. Hence, the complexities of unpacking the primitive and packing the response are abstracted away from the user as can be seen in FIG. 7(*a*). However, the user's power to manipulate each individual field in the response has been preserved. The completed behavior for the same command is shown in FIG. 7(*b*), illustrating how simple C constructs can be used to plug in the response behavior of the RFID tag.

3. Compiler-Generated RFID Tag Program

The RFID compiler 5 generates a C program which can be executed on the target processor, e.g., embedded processor 45, based on the input macros specification of the primitives and responses and the corresponding specified behavior. The compiler 5 generates routines for the unpacking of the received primitive into the corresponding fields. It generates a set of decode operations that will be executed in the processor which identify the RFID primitive that was received by the processor and generate the appropriate response. The compiler 5 also generates routines for packing the response from the fields in the behavior. The final RFID tag controller code captures completely the details of the RFID communication protocol and its complexity is abstracted away from the user. The C code may be generated as follows. First, the compiler 5 reads the abstract syntax tree representation of the input macros and generates the final RFID C program. Next, the compiler 5 generates decode instructions that identify the incoming RFID commands. For each case of an incoming command, the compiler 5 also creates routines that unpack the command into the fields that it is expected to have. The compiler 5 then attaches the corresponding behavior to each case of an incoming command. Finally, routines for packing the response are created. The result is that the final generated RFID C program, from the above phases and steps, receives the incoming RFID primitive, identifies it based on the value of its opcode, unpacks its fields, executes its behavior and packs its response and sends it to the interrogator, such as RFID reader 40.

4. Extensibility

It is also important that the present invention be extensible such that it can be used in a potential RFID application scenario where the RFID tag, such as RFID tag 25, has the capability to respond to primitives from multiple standards (ISO and ANSI) and to proprietary primitives. For example, it is possible that suppliers might need to supply their RFID-tagged shipments to retailers in different countries who may mandate different RFID standards. In such a scenario, it would be greatly beneficial for the supplier to use RFID tags that are capable of responding to multiple standards. In addition, in the example of warehouse management, a supplier may want the RFID tags to have some proprietary primitives, such as setting and querying the positions, manufacture dates, prices, and product codes, etc. of the products.

Thus, in the example shown in FIGS. 4, 5, 6 and 7(a) and 7(b), the original macros file can be extended to add new primitives from, for example, ANSI as well as custom primitives. FIG. 8 shows the new macros specification file after a set of new primitives have been added to the original macros specification file from FIG. 5. The new macros that are being added correspond to the ANSI primitives "Get Error" (ager), and "Set Beeper On" (abpn), and the custom primitives "Set Position" (spos), "Get Position" (gpos), "Get Manufacture Date" (gdat) and "Get Product Code" (gcod). The new field declarations are appended to the declarations section, and the new macros declarations are appended to the main section in the original macros file. The compiler 5 then generates the template for the behavior of the tag in response to the current set of primitives. The user edits the templates to plug in the behavior, and the compiler 5 generates the RFID C program to be executed on the RFID tag 25.

Thus, the present invention provides a compilation flow that can automatically generate IC software, such as software for an RFID tag 25, based on a simple input description of the standards primitives and corresponding behavior. The invention is extensible, as it allows for addition or removal of a set of custom primitives that may be a subset or superset of the original standard. In addition, the invention can accommodate multiple, often competing, standards, such as ISO and ANSI, while serving the needs of current and future applications. The invention generates a program, such as a C program, that can be executed on any microprocessor that has its own machine language and corresponding compiler, such as a C compiler.

Power optimization is critical in RFID systems, such as RFID system 30, since the power supply of the tags, such as RFID tags 25, is limited. Since these systems are designed for extremely low-cost large-scale applications, replacement of batteries is not feasible. So far, some research has been done to minimize power consumption of anti collision protocols and to implement energy conserving access protocols in RFID systems. However power optimizations at the instruction level in the tag have been explored in any previous research.

The process of executing machine instructions in a processor takes several phases: fetch the instruction from memory, decode the instruction, fetch the inputs from registers, execute the instruction, and write the result back to registers. Reducing the size of the instruction set architecture can significantly reduce the amount of logic for instruction decode as well as settings to the remainder of the processor. This generally translates into reduced power consumption. In some cases, removal of high-power consuming capabilities (e.g. multiplication) can also result in significant power savings.

It is also possible to design the processor to be sensitive to commonly occurring patterns in the resulting software run on the processor. The instruction encoding can be adjusted to reduce the number of bits required to encode an instruction, as well as to reduce the bit changes between different instructions which impact power consumption.

Behavioral synthesis techniques can be applied to translate the RFID macros and behavioral C descriptions into a direct hardware implementation that may be instantiated on a low-power FPGA or other programmable device or fabricated into an ASIC. The ASIC implementation would provide significant power savings over a processor.

In short, the present invention provides explicit parameters and points of capture that can be adjusted to alternative values that still satisfy the specified standards. These parameters and adjustments make it possible to use commercially available software tools that evaluate power consumption and optimize the target microprocessor code that will be embedded in the target IC.

While preferred embodiments of the invention have been described and illustrated above, it should be understood that these are exemplary of the invention and are not to be considered as limiting. Additions, deletions, substitutions, and other modifications can be made without departing from the spirit or scope of the present invention. Accordingly, the invention is not to be considered as limited by the foregoing description but is only limited by the scope of the appended claims.

What is claimed is:

1. A method of generating software code for a processor of an integrated circuit for use in an application having standards having a plurality of primitives, each of said primitives having a corresponding response, the method comprising:

generating a macros description of each of said primitives and the response corresponding to each of said primitives, said macros description including information relating to a number of first fields for each of said primitives and a number of second fields for the response corresponding to each of said primitives;

generating a blank version of a template, said blank version of said template including each of said second fields;

receiving a completed version of said template, said completed version of said template specifying one or more values for each of said second fields, said completed version of said template specifying a behavior of said integrated circuit in response to said primitives; and compiling said software code based on said macros description and said completed version of said template.

2. The method according to claim 1, further comprising compiling said software code into executable code, said executable code being executable by said processor.

3. The method according to claim 1, wherein said macros description is also a macros description of one or more custom primitives and a second response to each of said custom primitives, wherein said macros description further includes information relating to a number of third fields for each of said one or more custom primitives and a number of fourth fields for the second response corresponding to each of said one or more custom primitives, wherein said blank version of said template includes each of said fourth fields, and wherein said completed version of said template specifies one or more values for each of said fourth fields and also specifies a behavior of said integrated circuit in response to said one or more custom primitives.

4. The method according to claim 1, wherein said macros description includes a declarations section that sets forth a length of each of said first and second fields and a main section that lists, for each of said primitives, particular ones of said first fields that correspond thereto, and that lists, for each response, particular ones of said second fields that correspond thereto.

5. The method according to claim 1, said completed version of said template including programming constructs for specifying said behavior of said integrated circuit.

6. The method according to claim 1, wherein said integrated circuit is part of an RFID tag.

7. A computer readable medium having computer executable instructions for performing the method recited in claim 1.

8. A computer software tool embedded on a computer-readable medium for generating software code for a processor of an integrated circuit for use in an application having standards having a plurality of primitives, each of said primitives having a corresponding response, said software tool having one or more computer executable routines adapted to:
  enable a creation of a macros description of each of said primitives and the response corresponding to each of said primitives, said macros description including information relating to a number of first fields for each of said primitives and a number of second fields for the response corresponding to each of said primitives;
  generate a blank version of a template, said blank version of said template including each of said second fields;
  enable a creation of a completed version of said template, said completed version of said template specifying one or more values for each of said second fields, said completed version of said template specifying a behavior of said integrated circuit in response to said primitives; and
  compile said software code based on said macros description and said completed version of said template.

9. The software tool according to claim 8, wherein said macros description is also a macros description of one or more custom primitives and a second response to each of said custom primitives, wherein said macros description further includes information relating to a number of third fields for each of said one or more custom primitives and a number of fourth fields for the second response corresponding to each of said one or more custom primitives, wherein said blank version of said template includes each of said fourth fields, and wherein said completed version of said template specifies one or more values for each of said fourth fields and also specifies a behavior of said integrated circuit in response to said one or more custom primitives.

10. The software tool according to claim 8, wherein said macros description includes a declarations section that sets forth a length of each of said first and second fields and a main section that lists, for each of said primitives, particular ones of said first fields that correspond thereto, and that lists, for each response, particular ones of said second fields that correspond thereto.

11. The software tool according to claim 8, said completed version of said template including programming constructs for specifying said behavior of said integrated circuit.

12. A method of generating software code for a processor of an integrated circuit for use in an application having standards having a plurality of primitives, each of said primitives having a corresponding response, the method comprising:
  generating a macros description of each of said primitives and the response corresponding to each of said primitives, said macros description including information relating to a number of first fields for each of said primitives and a number of second fields for the response corresponding to each of said primitives;
  receiving a specification of a behavior of said integrated circuit in response to said primitives, said specification specifying one or more values for each of said second fields; and
  compiling said software code based on said macros description and said specification.

13. The method according to claim 12, further comprising compiling said software code into executable code, said executable code being executable by said processor.

14. The method according to claim 12, said specification including programming constructs for specifying said behavior of said integrated circuit.

* * * * *

UNITED STATES PATENT AND TRADEMARK OFFICE
CERTIFICATE OF CORRECTION

PATENT NO. : 7,469,390 B2  Page 1 of 1
APPLICATION NO. : 11/406194
DATED : December 23, 2008
INVENTOR(S) : Marlin H. Mickle et al.

It is certified that error appears in the above-identified patent and that said Letters Patent is hereby corrected as shown below:

Figure 1, reference number 20, second line, "Complier" should be --Compiler--.
Figure 5, line 2, "Interragator ID" should be --Interrogator ID--.
Figure 5, line 5, "Interragator ID" should be --Interrogator ID--.
Column 6, line 20, "all token" should be --all tokens--.
Column 6, line 62, "and generate" should be --and generates--.

Signed and Sealed this

Twenty-third Day of June, 2009

JOHN DOLL
*Acting Director of the United States Patent and Trademark Office*